(12) United States Patent
Pachnicke et al.

(10) Patent No.: US 9,231,724 B2
(45) Date of Patent: Jan. 5, 2016

(54) METHOD FOR OPERATING AN OPTICAL TRANSMISSION SYSTEM

(71) Applicant: ADVA Optical Networking SE, Meiningen OT Dreissigacker (DE)

(72) Inventors: Stephan Pachnicke, Dortmund (DE); Michael Eiselt, Kirchheim (DE); Markus Roppelt, Karlsruhe (DE); Mirko Lawin, Meiningen (DE); Klaus Grobe, Planegg (DE); Jörg-Peter Elbers, Fürstenfeldbruck (DE)

(73) Assignee: ADVA Optical Networking SE, Meiningen OT Dreissigacker (DE)

( * ) Notice: Subject to any disclaimer, the term of this patent is extended or adjusted under 35 U.S.C. 154(b) by 203 days.

(21) Appl. No.: 13/828,130

(22) Filed: Mar. 14, 2013

(65) Prior Publication Data

US 2013/0251364 A1     Sep. 26, 2013

(30) Foreign Application Priority Data

Mar. 20, 2012  (EP) .................................... 12160356

(51) Int. Cl.
*H04J 14/00*   (2006.01)
*H04J 14/02*   (2006.01)

(52) U.S. Cl.
CPC ......... *H04J 14/0227* (2013.01); *H04J 14/0276* (2013.01)

(58) Field of Classification Search
CPC ............................................... H04B 2210/075
USPC .......................................................... 398/66
See application file for complete search history.

(56) References Cited

U.S. PATENT DOCUMENTS

| 6,291,813 | B1 * | 9/2001 | Ackerman et al. | ......... 250/214 R |
| 2002/0154372 | A1 * | 10/2002 | Chung et al. | .................. 359/182 |

(Continued)

FOREIGN PATENT DOCUMENTS

| EP | 0 637 148 | 2/1995 |
| WO | WO 98/51024 | 11/1998 |

(Continued)

OTHER PUBLICATIONS

European Search Report and Search Opinion for Application No. EP 12 16 0356 dated Aug. 30, 2012.

*Primary Examiner* — Danny Leung
(74) *Attorney, Agent, or Firm* — Jenkins, Wilson, Taylor & Hunt, P.A.

(57) ABSTRACT

An optical transmission system method including generating for a tunable laser a pilot tone having an adjustable pilot tone frequency identifying a wavelength division multiplexing channel used by the tunable laser; multiplying the pilot tone with pilot tone data to provide a pilot tone data signal; supplying the pilot tone data signal and a high frequency data signal to the tunable laser generating an optical laser signal output by the tunable laser responsive to the supplied signals; transporting the optical laser signal to a central wavelength to locker; converting the received optical laser signal to provide a pilot tone data signal for wavelength division multiplexing channels demodulated to detect the pilot tone and the pilot tone data for each individual wavelength division multiplexing channel; and identifying the wavelength division multiplexing channel on the basis of the pilot tone frequency of the detected pilot tone and evaluating the pilot tone data.

11 Claims, 4 Drawing Sheets

(56) References Cited

U.S. PATENT DOCUMENTS

| | | | |
|---|---|---|---|
| 2003/0016413 A1* | 1/2003 | Carrick et al. | 359/124 |
| 2004/0005150 A1* | 1/2004 | Takeshita | 398/32 |
| 2008/0085118 A1 | 4/2008 | Effenberger | |
| 2011/0135306 A1* | 6/2011 | Kim et al. | 398/68 |

FOREIGN PATENT DOCUMENTS

| | | |
|---|---|---|
| WO | WO 99/33200 | 7/1999 |
| WO | WO 01/54319 | 7/2001 |
| WO | WO 2011/131512 | 10/2011 |

\* cited by examiner

METHOD FOR OPERATING AN OPTICAL TRANSMISSION SYSTEM

TECHNICAL FIELD

The invention relates to a method for operating an optical transmission system and in particular to a method for simultaneous remote wavelength locking and providing an embedded communication channel in an optical transmission system.

BACKGROUND

The capacity of optical transmission systems comprising fibre optics is increased by using wavelength division multiplexing (WDM) technology. For the operation and maintenance of such an optical transmission system it is necessary to monitor the signal's wavelength. In conventional optical transmission systems it is possible to use pilot tones for monitoring the WDM signals directly in an optical layer. These pilot tones form small sinusoidal signal components added to the WDM signals. Pilot tones can be used to monitor various optical parameters of a WDM signal such as optical power, wavelength and optical signal to noise ratio (OSNR). The pilot tones allow to monitor parameters of the WDM signal without expensive demultiplexing filters such as tunable optical filters and diffraction gratings. Pilot tones are suited for being used in a dynamic WDM network since pilot tones are bound to follow their corresponding optical signals anywhere in the WDM network. Therefore, an optical path taken by each WDM signal can be monitored by tracking its tone frequency. Pilot tones are sent from a first optical terminal to a second optical terminal. Pilot tones of conventional optical transmission systems are used for frequency stabilization, channel recognition or monitoring of the transported optical signals. In an optical transmission system the bandwidth between a transmitting and a receiving terminal is limited. In conventional optical transmission systems additional communication channels such as an optical supervisory channel are commonly used. However, the use of such a communication channel diminishes the remaining data bandwidth.

SUMMARY

Accordingly, it is an object of the present invention to provide a method for operating an optical transmission system allowing to transport control data between terminals of the optical transmission system without reducing the bandwidth available or wavelength division multiplexing channels.

This object is achieved by a method comprising the features of the claims.

Accordingly, the invention provides a method for operating an optical transmission system, the method comprising the steps of:

(a) generating for a tunable laser a pilot tone having an adjustable pilot tone frequency which identifies a wavelength division multiplexing channel used by the respective tunable laser;

(b) modulating the generated pilot tone of said tunable laser with pilot tone data to provide a pilot tone data signal;

(c) supplying the pilot tone data signal and a high frequency data signal to said tunable laser which generates an optical laser signal output by said tunable laser in response to the supplied signals;

(d) transporting said optical laser signal to a remote central wavelength locker via an optical transport medium;

(e) converting the received optical laser signal by means of a photo diode of said remote central wavelength locker to provide a pilot tone data signal for wavelength division multiplexing channels which is demodulated to detect the pilot tone and the pilot tone data for each individual wavelength division multiplexing channel, an electrical signal of the pilot tone and a reference signal; and (f) identifying the wavelength division multiplexing channel used by the respective tunable laser on the basis of the pilot tone frequency of the detected pilot tone and evaluating the pilot tone data of the identified wavelength division multiplexing channel.

In a possible embodiment of the method according to the present invention the optical laser signal is output by a tunable laser of a first terminal where at least one wavelength is terminated, and transported via the optical transport medium upstream to the remote central wavelength locker of a second terminal where a multitude of wavelengths is terminated.

In a possible implementation the first terminal is formed by an optical network unit ONU.

In a further possible implementation the second terminal is formed by an optical line terminal OLT.

In a further possible embodiment of the method according to the present invention in the remote central wavelength locker the received optical laser signal is split into a first signal part which is filtered by an etalon filter and applied to an etalon photo diode and into a second signal part which is applied directly to a reference photo diode.

In a further possible embodiment of the method according to the present invention the pilot tone amplitude at the reference photo diode and at the etalon photo diode are compared to monitor whether the wavelength of the respective optical laser signal does match a predetermined target wavelength and/or whether the amplitude of the optical laser signal matches a predetermined target power.

In a further possible embodiment of the method according to the present invention the wavelength and/or the power of the tunable laser are controlled by said second terminal by transmitting a feedback control signal via a downstream embedded communication channel to said first terminal to adjust the respective tunable laser in response to the received feedback control signal.

In a further possible embodiment of the method according to the present invention the pilot tone data signal and the high frequency data signal are added to generate a laser control signal applied to the tunable laser which generates the optical laser signal output by the tunable laser in response to said laser control signal.

In a further possible embodiment of the method according to the present invention the high frequency data signal is provided for transporting data at a high data rate and the pilot tone data signal is provided for transporting control data at a low data rate.

In a further possible implementation of the method according to the present invention the high frequency data signal is provided for transporting data at a high data rate of at least one 100 Mbit/sec.

In a possible embodiment of the method according to the present invention the demodulation is performed by a Fourier transformation.

In a further possible embodiment of the method according to the present invention the identifying of the wavelength division multiplexing channel is performed without locking the respective wavelength.

In a further possible embodiment of the method according to the present invention the control data transported by the pilot tone data signal comprises an identifier of the respective first terminal, a vendor identifier and/or status information data.

The invention further provides an optical network unit having the features of claim 11.

The invention provides an optical network unit comprising:
a generator adapted to generate a pilot tone having an adjustable pilot tone frequency which identifies a wavelength division multiplexing channel used by the respective tunable laser,
a multiplier adapted to multiply the generated pilot tone of said tunable laser with pilot tone data to provide a pilot tone data signal which is supplied along with a high frequency data signal to said tunable laser which generates an optical laser signal output by said tunable laser in response to the supplied signals.

The invention further provides an optical line terminal having the features of claim 12.

The invention provides an optical line terminal comprising:
a central wavelength locker having at least one photo diode adapted to convert a received optical laser signal to provide a pilot tone data signal for wavelength division multiplexing channels and a demodulator adapted to demodulate the pilot tone data signal to detect a pilot tone and pilot tone data for each individual wavelength division multiplexing channel,
wherein the detected pilot tone is used to identify the wavelength division multiplexing channel used by a remote tunable laser on the basis of a pilot tone frequency of the detected pilot tone.

The invention further provides an optical transmission system having the features of claim 13.

Accordingly, the invention provides an optical transmission system comprising at least one optical network unit comprising:
a generator adapted to generate a pilot tone having an adjustable pilot tone frequency which identifies a wavelength division multiplexing channel used by the respective tunable laser,
a multiplier adapted to multiply the generated pilot tone of said tunable laser with pilot tone data to provide a pilot tone data signal which is supplied along with a high frequency data signal to said tunable laser which generates an optical laser signal output by the said tunable laser in response to the supplied signals and comprising
an optical line terminal comprising:
a central wavelength locker having at least one photo diode adapted to convert a received optical line signal to provide a pilot tone data signal for wavelength division multiplexing channels and a demodulator adapted to demodulate a pilot tone data signal to detect a pilot tone and pilot tone data for each individual wavelength division multiplexing channel,
wherein the detected pilot tone is used to identify the wavelength division multiplexing channel used by a remote tunable laser on the basis of a pilot tone frequency of the detected pilot tone and comprising
an optical transport medium adapted to transport the optical laser signal from said optical network unit to said optical line terminal.

In a possible embodiment of the optical transmission system according to the present invention several optical network units are connected in parallel to an arrayed waveguide grating adapted to multiplex the optical laser signal output by the optical network units in a first band upstream on said optical transport medium and to demultiplex an optical laser signal received via said optical transport medium in a second band downstream to said optical network units.

In a further possible implementation of the optical transmission system according to the present invention the optical frequencies of the first band are located in the conventional (C-) band and the optical frequencies of the second band are located in the long wavelength (L-) band.

In a possible embodiment of the optical transmission system according to the present invention the optical line terminal is located at a central office connected to a remote node via the optical transport medium comprising at least one glass fibre.

In a possible implementation of the optical transmission system according to the present invention the remote node comprises the arrayed wavelength grating being connected to several optical network units of clients.

BRIEF DESCRIPTION OF THE DRAWINGS

In the following possible embodiments of the method for operating an optical transmission system and of the optical transmission system according to the present invention are described with reference to the enclosed figures.

DETAILED DESCRIPTION

Figure 1:
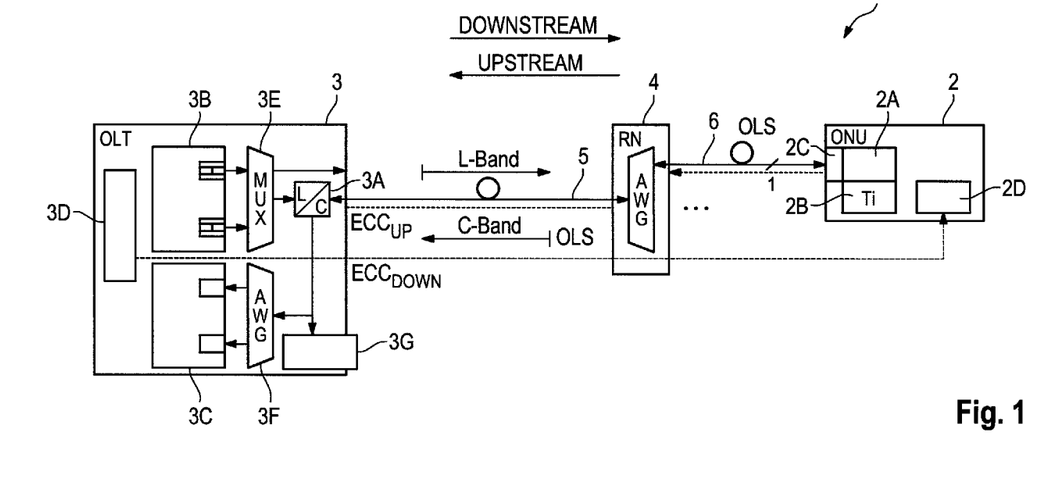
FIG. 1 shows a block diagram of a possible implementation of an optical transmission system according to the present invention.

As can be seen in FIG. 1 the optical transmission system 1 according to the present invention can comprise a first terminal where at least one wavelength is terminated and a second terminal where a multitude of wavelengths is terminated. The first terminal is formed in the shown implementation by an optical network unit ONU 2 and the second terminal is formed in the shown implementation by an optical line terminal OLT 3. The optical line terminal 3 can be located at a central office connected to a remote node RN 4 via an optical transport medium 5 comprising at least one glass fibre. The remote node 4 can comprise an arrayed wavelength grating AWG being connected to several optical network units ONUs 2-*i* clients via optical fibres 6. The optical network unit 2 can comprise at least one generator adapted to generate a pilot tone PT having an adjustable pilot tone frequency $f_{PT}$ which identifies a wavelength division multiplexing WDM channel used by a tunable laser L of the optical network unit ONU 2-*i*. Further, the optical network unit ONU 2-*i* comprises a multiplier adapted to multiply the generated pilot tone PT of the tunable laser L with the pilot tone data PTD to provide a pilot tone data signal PTDS which is supplied along with a high frequency data signal HFDS to the tunable laser L which generates an optical laser signal OLS output by the tunable laser L via the fibre 6 to the remote node 4 in response to the supplied signals. The tunable laser L can be provided within a pluggable module 2A of the optical network unit 2-i connected to a tuning instance 2B which is a unit which controls the tuning of the laser L. To the pluggable module 2A comprising the tunable laser L a diplexer 2C can be connected which separates the upstream and downstream direction at the optical network unit ONU 2. The optical network unit 2-i can further comprise a data processing unit 2D as shown in FIG. 1. The number of optical network units ONU 2-i connected via separate fibres 6-i to the remote node 4 can vary. In a possible implementation forty optical network units 2-i are connected to the remote node 4. The remote node 4 comprises at least one arrayed wavelength grating AWG which can separate a wavelength multiplex signal into different signal parts. Accordingly, the arrayed wavelength grating AWG has a multiplexing/demultiplexing functionality. In upstream direction from the optical network unit 2-i to the optical line terminal 3 the arrayed wavelength grating AWG performs a signal multiplexing whereas in the opposite direction from the optical line terminal 3 to the optical network unit 2-i the arrayed wavelength grating AWG performs a demultiplexing of the optical signal to the different optical network units ONUs of different clients. An optical transport medium 5 connects the arrayed wavelength grating AWG to an L/C splitter 3A provided within the optical line terminal 3. Between the arrayed wavelength grating AWG and the optical network unit 2-i there are two frequency bands used, i.e., a first frequency band for downstream data transport, e.g. an L-band and a second frequency band for upstream data transport, e.g. in a C-band. In a possible implementation a cyclic arrayed wavelength grating AWG is used which allows the passage for a frequency in the C-band and in the L-band. The frequencies/wavelengths for the C- and L-bands can be a subset of 40 channels chosen from 48 channels as specified in ITU-T G.698.3. Between the arrayed waveguide grating AWG and the optical line terminal OLT 3 an optical multiplex signal of all connected optical network units ONUS 2-i is transported. The L/C splitter 3A of the optical line terminal 3 performs a splitting between the L-band used in the downstream direction and the C-band which can be used in the upstream direction. The optical line terminal 3 comprises a transmission TX array 3B and a receiving RX array 3C both connected to a data processing unit 3B such as a microcomputer. The transmission TX array 3B of the optical line terminal 3 comprises a predetermined number N of laser units transmitting signals at different wavelengths A and connected to a multiplexer 3E multiplexing the transmitted laser signals on the L-band used in the downstream direction. The optical signal received by the optical line terminal 3 in the C-band is split by the L/C splitter 3A such that the signals in the C-band are applied to an arrayed waveguide grating 3F used for demultiplexing the received optical signals in the C-band to a predetermined number N of receiving units within the receiving RX array 3C of the optical line terminal 3. Further, the received optical signals split by the L/C splitter 3A in the C-band are applied to a central wavelength locker 3G as shown in FIG. 1. The central wavelength locker 3G can comprise in a possible implementation at least one photo diode adapted to convert a received optical laser signal OLS transported in the C-band to provide a pilot tone data signal PTDS for wavelength division multiplexing channels and a demodulator adapted to demodulate the pilot tone data signal PTDS to detect a pilot tone PT and pilot tone data PTD for each individual wavelength division multiplexing WDM channel. The detected pilot tone PT can be used to identify the wavelength division multiplexing WDM channel used by a remote tunable laser L of an optical network unit 2-i on the basis of a pilot tone frequency $f_{PT}$ of the detected pilot tone PT. Accordingly, in the remote central wavelength locker 3G of the optical line terminal 3 the received optical laser signal OLS is split into a first signal part which can be filtered by an etalon filter and applied to an etalon photo diode, and into a second signal part which can be applied directly to a reference photo diode. In a possible implementation the pilot tone amplitude at a reference photo diode and at the etalon photo diode are compared with each other to monitor whether the wavelength λ of the respective optical laser signal OLS does match a predetermined target wavelength and/or whether the amplitude of the optical laser signal OLS matches a predetermined target power. The wavelength and/or the power of the tunable laser L in the optical network unit 2-i can then be controlled by the optical line terminal 3 by transmitting a feedback control signal FCS via a downstream embedded communication channel $ECC_{DOWN}$ to the optical network unit 2-i to adjust the respective tunable laser L in response to the transmitted feedback control signal FCS.

Figure 2:
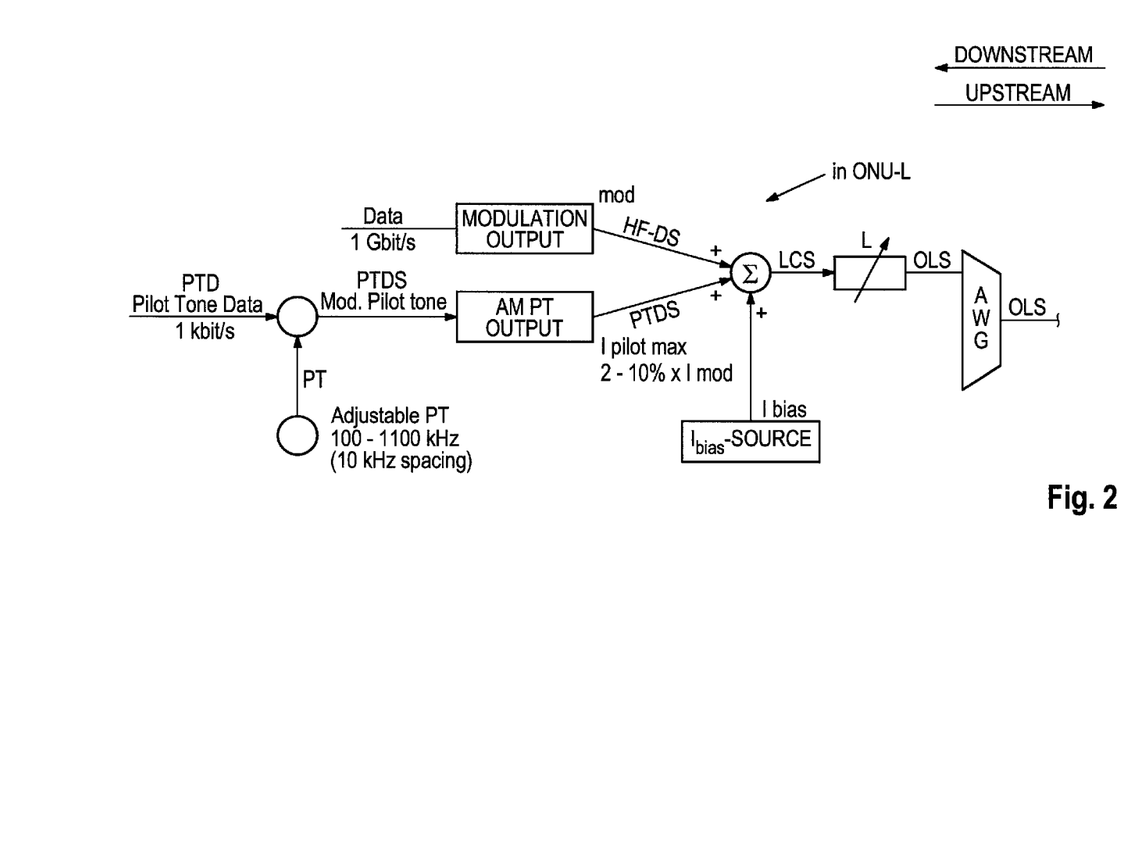
FIG. 2 shows a diagram for illustrating a generation of an optical laser signal as employed by the method for operating an optical transmission system according to the present invention.

FIG. 2 shows a diagram for illustrating the generation of an optical line signal OLS applied by an optical network unit 2-i upstream to an optical line terminal 3 of the optical transmission system 1. In a first step a pilot tone PT having an adjustable pilot tone frequency $f_{PT}$ is generated by a pilot tone generator, for example in a frequency range of 100 to 1100 kHz with a 10 kHz spacing. The adjustable pilot tone frequency can identify a wavelength division multiplexing WDM channel used by the respective tunable laser L within the module 2A of the optical network unit 2-i. The generated pilot tone PT is multiplied with pilot tone data PTD to provide a pilot tone data signal PTDS as shown in FIG. 2. This pilot tone data signal PTDS is supplied with a high frequency data signal HFDS to the tunable laser L which generates an optical laser signal OLS output by the tunable laser L in response to the supplied signals, i.e. in response to the high frequency data signal HFDS and the pilot tone data signal PTDS. In a possible embodiment the pilot tone data signal PTDS and the high frequency data signal HFDS are added by adding means as shown in FIG. 2 to generate a laser control signal LCS applied to the tunable laser L which generates the optical laser signal OLS output by the tunable laser L in response to the laser control signal LCS output by the adding means as shown in FIG. 2. The high frequency data signal HFDS can be provided for transporting data at a high data rate of at least 100 Mbit/sec. The pilot tone data signal PTDS output by the multiplier is provided for transporting control data at a low data rate. The control data transported by the pilot tone data signal PTDS can comprise in a possible implementation an identifier of the respective optical network unit 2-i. Further, the control data transported by the pilot tone data signal PTDS can comprise in a possible implementation a vendor identifier or status information data of the optical network unit 2-i. The optical line signal OLS output by the tunable laser L of the respective optical network unit 2-i is multiplexed by the arrayed wavelength grating AWG provided within the remote nodes 4 of the optical transmission system 1 as shown in FIG. 1. In a possible implementation an adding of the high frequency data signal HFDS and the pilot tone data signal PTDS is performed by an adder by adding corresponding modulated electrical currents. In a possible implementation this current adder can be supplied with a bias current provided by a bias current source as shown in FIG. 2. The optical laser signal OLS is transported to the remote central wavelength locker 3G of the optical line terminal 3 within a predetermined frequency band such as the C-band in upstream direction. At the remote central wavelength locker 3G the received optical laser signal OLS is converted by means of a photo diode to provide the pilot tone data signal PTDS for wavelength division multiplexing channels, wherein the pilot tone data signal PTDS is demodulated to detect the pilot tone PT and the pilot tone data PTD for each individual wavelength division multiplexing WDM channel. In a possible implementation this demodulation can be performed by a Fourier transformation. The high frequency data signal HFDS has an essentially higher data rate of e.g. 1 to 10 Gbit/sec than the pilot tone data signal PTDS having a maximum frequency of several Megahertz. The high frequency data signal HFDS is used for transmission of application data from the optical network unit 2-$i$ to the optical line terminal OLT 3. The separation between the high frequency data signal HFDS and the pilot tone data signal PTDS can be performed by the inherent separation of the two data streams because of the different frequency ranges used for the signals.

On the basis of the pilot tone frequency $f_{PT}$ of the detected pilot tone PT the wavelength division multiplexing WDM channel used by the respective tunable laser L can be identified. Further, the pilot tone data PTD of the identified wavelength division multiplexing WDM channel can then be evaluated by the processing means of the optical line terminal 3.

Figure 3A:
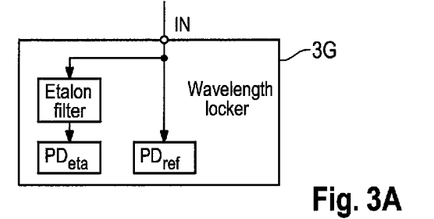
FIG. 3A shows a block diagram illustrating a possible implementation of a wavelength locker as used by an optical transmission system according to the present invention.
Figure 3B:
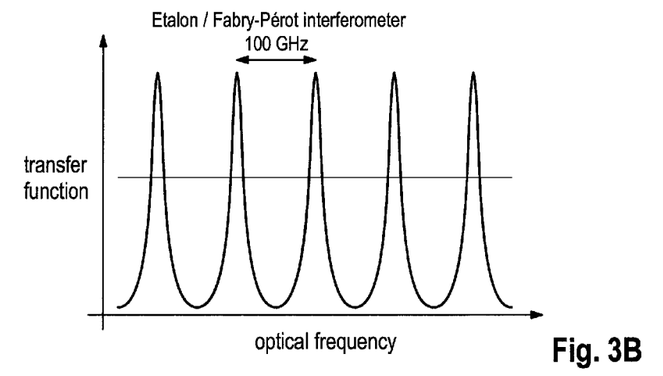
FIG. 3B shows a transfer function of a wavelength locker as shown in FIG. 3A.

FIG. 3 shows a block diagram of a possible implementation of the central wavelength locker 3G as used by an optical line terminal OLT 3 of the optical transmission system 1 according to the present invention. The central wavelength locker 3G comprises a signal input IN connected to the L/C splitter 3A of the optical line terminal 3 as shown in FIG. 1. The received optical signal OLS is split into a first signal part which is filtered by an etalon filter and into a second signal part as shown in FIG. 3A. The first signal part filtered by the etalon filter is applied to an etalon photo diode $PD_{eta}$. The second signal part is applied directly to a reference photo diode $PD_{ref}$. The pilot tone amplitude at the reference photo diode $PD_{ref}$ and at the etalon photo diode $PD_{eta}$ can be compared to each other to monitor whether a wavelength λ of the received respective optical laser signal OLS does match a predetermined target wavelength and/or whether the amplitude of the optical laser signal OLS matches a predetermined target power. This comparison can be performed by data processing means 3D of the optical line terminal 3 as shown in FIG. 1. The wavelength and/or the power of the tunable laser L within the respective optical network unit 2-$i$ comprising the respective laser L can then be controlled by transmitting a feedback control signal FCS via downstream embedded communication channel ECC down to the optical network unit 2-$i$ to adjust the respective tunable laser L in response to the transmitted feedback control signal FCS. In a possible embodiment the reference photo diode $PD_{ref}$ and the wavelength locker 3G can be used to detect the pilot tone PD of one or more wavelength division multiplexing WDM channels simultaneously. The reference photo diode $PD_{ref}$ receives an optical signal in the complete C-band unfiltered. The received signal can be demodulated by use of a Fourier transformation to detect a pilot tone PT and a pilot tone data signal for each individual wavelength division multiplexing channel WDM. After having identified the wavelength division multiplexing channel used by the respective tunable laser L on the basis of the respective pilot tone frequency $f_{PT}$ of the detected pilot tone PT, the pilot tone data PTD of the identified wavelength division multiplexing WDM channel can be evaluated by processing means of the optical line terminal 3. The pilot tone data PTD can be received by the same photo diode. Different AM frequencies of the pilot tones PT can be used to distinguish between different WDM channels. In a possible implementation the etalon filter is implemented by a Fabry-Perot-Interferometer having a transfer function as shown in FIG. 3B. In a possible implementation the frequency grid used by the Fabry-Perot-Interferometer can be 100 GHz as shown in FIG. 3B.

Figure 4:
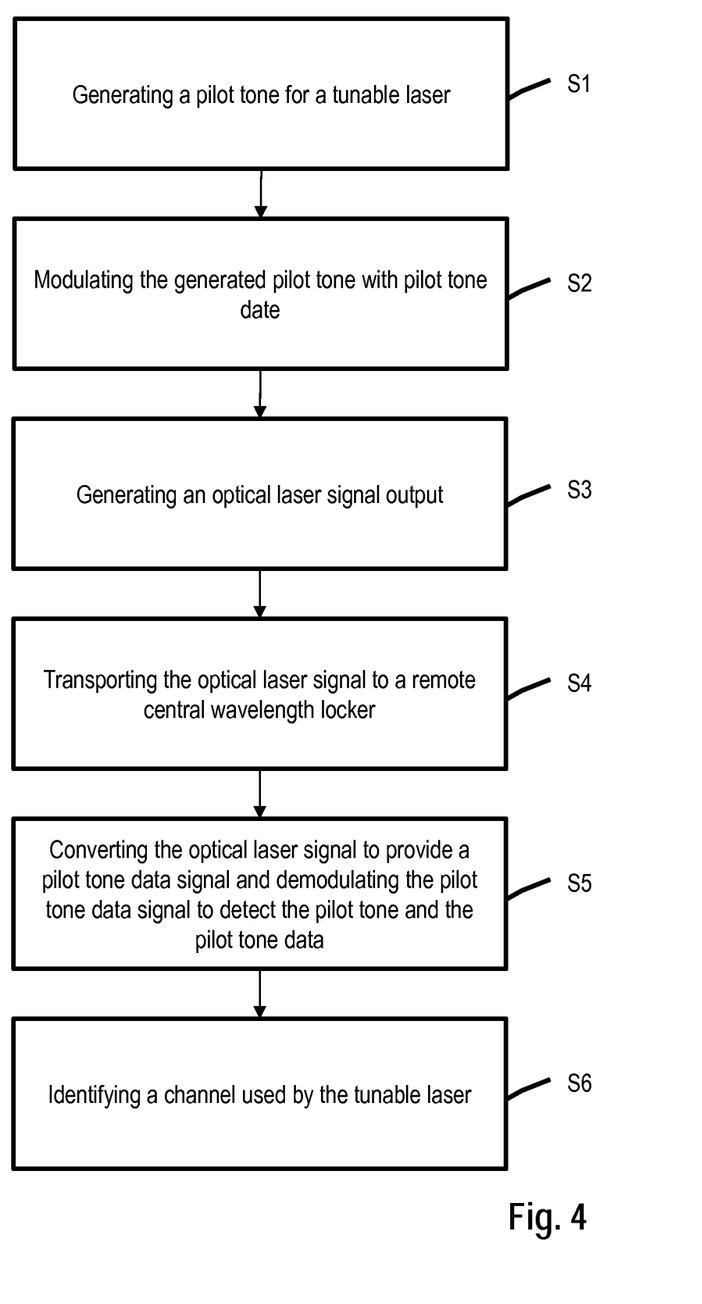
FIG. 4 shows a flow chart of a possible embodiment of a method for operating an optical transmission system according to the present invention.

FIG. 4 shows a flowchart of a possible implementation of a method according to the present invention for operating an optical transmission system.

In a first step S1 a pilot tone PT is generated for a tunable laser L having an adjustable pilot tone frequency $f_{PT}$ which identifies a wavelength division multiplexing WDM channel used by the respective tunable laser L.

In a further step S2 the generated pilot tone PT of the tunable laser L is modulated with pilot tone data PTD to provide a pilot tone data signal PTDS.

In a further step S3 the pilot tone data signal PTDS and a high frequency data signal HFDS are supplied to the tunable laser L which generates an optical laser signal OLS output by the tunable laser L in response to the supplied signals.

In a further step S4 the optical laser signal OLS is transported to a remote central wavelength locker via an optical transport medium.

In a further step S5 the received optical laser signal OLS is converted by means of a photo diode of the remote central wavelength locker to provide a pilot tone data signal PTDS for the wavelength division multiplexing WDM channels which is then demodulated to detect the pilot tone PT and the pilot tone data PTD for each individual wavelength division multiplexing WDM channel.

In a further step S6 the wavelength division multiplexing WDM channel used by the respective tunable laser L is identified on the basis of the pilot tone frequency $f_{PT}$ of the detected pilot tone PT and the pilot tone data PTD of the identified wavelength division multiplexing WDM channel is then evaluated.

In a possible implementation the first three steps S1, S2, S3 are performed by the optical network unit 2-$i$ as shown in the optical transmission system 1 according to the present invention.

Steps S5, S6 can be performed in a possible implementation by the optical line terminal 3-$i$ of the optical transmission system 1 according to the present invention. The transport of the optical laser signal in step S4 is performed via glass fibres via the optical transport path formed by the optical transport medium 5 and the glass fibre 6 as shown in FIG. 1.

In the optical transmission system 1 according to the present invention the pilot tone PT is modulated with the pilot tone data signal PTDS. Accordingly, the pilot tone PT can be used as a means for transporting pilot tone data PTD forming in this way an additional embedded communication channel ECC in upstream direction. This additional upstream embedded communication channel $ECC_{UP}$ does not need the provision of an additional photo diode. In this way it is possible to transport data from the optical network unit 2-$i$ to the optical line terminal 3 within this created embedded communication channel $ECC_{UP}$. Data transported in this additional embedded communication channel $ECC_{UP}$ can comprise for instance an identifier of the optical network unit 2-$i$, a vendor ID or a status information data. By providing such an additional embedded communication channel $ECC_{UP}$ in upstream direction the control channel becomes independent from the data signal and is therefore also data protocol independent. With the method according to the present invention the data transmission bandwidth from the optical network unit 2-$i$ to the optical line terminal 3 is increased by providing an additional upstream embedded communication channel $ECC_{UP}$ without additional circuitry. A further advantage is that the transmission of the control data becomes independent of the transport protocol because the control data is transported outside the application data stream. With the method according to the present invention it is possible to combine both remote wavelength locking of a tunable laser and at the same time modulating a pilot tone with a data signal. At the receiving end, i.e. at the optical line terminal OLT, all wavelength division multiplexing channel tones can be detected by a single photo diode and be separated by use of Fourier transformation. The additional embedded communication channel $ECC_{UP}$ in upstream direction is provided without any additional components and without increasing the complexity of the optical transmission system 1.

In the optical transmission system 1 according to the present invention each user or optical network unit 2-$i$ can be connected to a different port of an athermal cyclic arrayed waveguide grating AWG of a remote node 4. This port can determine the optical network unit's specific upstream and downstream wavelengths. Due to the diametric of a cyclic arrayed waveguide grating only one channel grid, either up- or downstream, can coincide with the ITU-grid, e.g. 100 GHz. The grid in the counterdirection, for example in the L-band downstream, can slightly deviate against the ITU-grid. This offset can depend on the AWG design such as waveguide refractive index difference and free spectral range. In a possible implementation the AWG can implement an L-band grid of 97.2 GHz. For reduction of the circuitry within the optical network unit laser module the optical line terminal 3 of the optical transmission system 1 according to the present invention is provided with a central wavelength monitoring capability provided by the wavelength locker 3G. In a possible embodiment for wavelength control at the optical line terminal 3 the optical received power at the optical line terminal 3 receiving array 3C can be used as a metric for wavelength tuning. In a preferred embodiment the usage of an individual per wavelength pilot tone is used which are simultaneously detected at the common wavelength locker 3G of the optical line terminal 3. In order to distinguish between the different optical network unit ONU wavelengths A each is optical network unit 2-$i$ applies an amplitude modulation (pilot tone) with a distinct frequency to its optical signal. In the wavelength locker 3G a part of the signal is split and filtered by an etalon filter such as a Fabry-Perot-Interferometer, while the other signal part remains unfiltered and is detected by the reference photo diode $PD_{ref}$. By comparing the pilot tone amplitude at the reference photo diode and at the etalon photo diode the optical line terminal 3 can calculate whether the wavelength is higher or lower than a target frequency. A feedback from the optical line terminal 3 to the optical network unit 2-$i$ is provided via an embedded communication channel $ECC_{DOWN}$. With the optical transmission system 1 according to the present invention it is possible to simultaneously use the modulated pilot tone for monitoring power and wavelength of the remote tunable laser L and for providing an embedded communication channel ECC. This allows the deployment of a tunable laser L without an internal wavelength locker in a remote network unit such as the optical network unit ONU. At the same time this avoids any additional overheads or components for the communication between the remote network unit, i.e. the optical network unit ONU 2, and an optical line terminal OLT 3 within a central office.

The invention claimed is:

1. A method for operating an optical transmission system, the method comprising:
 (a) generating for a tunable laser of a first terminal a pilot tone having an adjustable pilot tone frequency which identifies a wavelength division multiplexing channel used by the respective tunable laser;
 (b) modulating the generated pilot tone of said tunable laser with pilot tone data to provide a pilot tone data signal;
 (c) supplying the pilot tone data signal and a high frequency data signal to said tunable laser which generates an optical laser signal output by said tunable laser in response to the supplied signals;
 (d) transporting said optical laser signal to a remote central wavelength locker of a second terminal via an optical transport medium;
 (e) converting the received optical laser signal by means of a photo diode of said remote central wavelength locker to provide a pilot tone data signal for wavelength division multiplexing channels which is demodulated to detect the pilot tone and the pilot tone data for each individual wavelength division multiplexing channel;
 (f) identifying the wavelength division multiplexing channel used by the respective tunable laser on the basis of the pilot tone frequency of the detected pilot tone and evaluating the pilot tone data of the identified wavelength division multiplexing channel;
 (g) splitting in the remote central wavelength locker the received optical laser signal into a first signal part which is filtered by an etalon filter and applied to an etalon photo diode and into a second signal part which is applied directly to a reference photo diode;
 (h) comparing the pilot tone amplitude at the reference photo diode and at the etalon photo diode to monitor whether the wavelength of the respective optical laser signal does match a predetermined target wavelength and/or whether the amplitude of the optical laser signal matches a predetermined target power; and
 (i) controlling the wavelength and/or the power of the tunable laser by said second terminal by transmitting a feedback control signal via a downstream embedded communication channel to said first terminal to adjust the respective tunable laser in response to the received feedback control signal.

2. The method according to claim 1, wherein at least one wavelength is terminated at said first terminal, and wherein a multitude of wavelengths is terminated at said second terminal.

3. The method according to claim 1, wherein the pilot tone data signal and the high frequency data signal are added to generate a laser control signal applied to the tunable laser which generates the optical laser signal output by said tunable laser in response to said laser control signal.

4. The method according to claim 1, wherein said high frequency data signal is provided for transporting data at a high data rate of at least 100 Mbit/sec and said pilot tone data signal is provided for transporting control data at a low data rate.

5. The method according to claim 1, wherein the demodulation is performed by a Fourier transformation, by a filter or by a filter bank.

6. The method according to claim 1, wherein the identifying of the wavelength division multiplexing channel is performed without locking the respective wavelength.

7. The method according to claim 4, wherein the control data transported by said pilot tone data signal comprises an identifier of the respective first terminal, a vendor identifier and/or status information data.

8. An optical line terminal comprising:
a central wavelength locker, comprising:
- at least one photo diode, which is converting a received optical laser signal to provide a pilot tone data signal for wavelength division multiplexing channels,
- a L/C splitter, which splits the received optical laser signal into a first signal part and a second signal part,
- an etalon filter which filters the first signal part,
- an etalon photo diode, which receives the first signal part filtered by the etalon filter, and
- a reference photo diode, which receives the second signal part;
- a demodulator, which is demodulating the pilot tone data signal to detect a pilot tone and pilot tone data for each individual wavelength division multiplexing channel, wherein the detected pilot tone is used to identify the wavelength division multiplexing channel used by a remote tunable laser on the basis of a pilot tone frequency of the detected pilot tone;
- a comparison unit adapted to compare the pilot tone amplitude at the reference photo diode and at the etalon photo diode to monitor whether the wavelength of the respective optical laser signal does match a predetermined target wavelength and/or whether the amplitude of the optical laser signal matches a predetermined target power; and
- a controlling unit adapted to control the wavelength and/or the power of said remote tunable laser by said second terminal by transmitting a feedback control signal via a downstream embedded communication channel to said remote tunable laser to adjust the respective tunable laser in response to the received feedback control signal.

9. An optical transmission system comprising at least one optical network unit, comprising:
- a generator, which is generating a pilot tone having an adjustable pilot tone frequency which identifies a wavelength division multiplexing channel used by the respective tunable laser,
- a modulation unit, which is modulating the generated pilot tone of said tunable laser with pilot tone data to provide a pilot tone data signal which is supplied along with a high frequency data signal to said tunable laser which generates an optical laser signal output by said tunable laser in response to the supplied signals;
- an optical line terminal comprising:
  - a central wavelength locker, comprising:
    - at least one photo diode, which is converting a received optical laser signal to provide a pilot tone data signal for wavelength division multiplexing channels,
    - a L/C splitter, which splits the received optical laser signal into a first signal part and a second signal part,
    - an etalon filter which filters the first signal part,
    - an etalon photo diode, which receives the first signal part filtered by the etalon filter, and
    - a reference photo diode, which receives the second signal part;
  - a demodulator adapted to demodulate the pilot tone data signal to detect a pilot tone and pilot tone data for each individual wavelength division multiplexing channel;
  - a comparison unit, comparing the pilot tone amplitude at the reference photo diode and at the etalon photo diode to monitor whether the wavelength of the respective optical laser signal does match a predetermined target wavelength and/or whether the amplitude of the optical laser signal matches a predetermined target power; and
  - a controlling unit, which controls the wavelength and/or the power of said tunable laser by said second terminal by transmitting a feedback control signal to said first terminal to adjust the respective tunable laser in response to the received feedback control signal, wherein the detected pilot tone is used to identify the wavelength division multiplexing channel used by a remote tunable laser on the basis of a pilot tone frequency of the detected pilot tone;
- a downstream embedded communication channel, which is transmitting the feedback control signal from said second terminal to said first terminal; and
- an optical transport medium, which is transporting the optical laser signal from said optical network unit to said optical line terminal.

10. The optical transmission system according to claim 9, wherein several optical network units are connected in parallel to an arrayed wavelength grating, which is multiplexing the optical laser signal output by the optical network units in a first band upstream on said optical transport medium and demultiplexing an optical laser signal received via said optical transport medium in a second band downstream to said optical network units.

11. The optical transmission system according to claim 9, wherein said optical line terminal is located at a central office connected to a remote node via said optical transport medium comprising at least one glass fibre, wherein said remote node comprises an arrayed waveguide grating being connected to several optical network units of clients.

\* \* \* \* \*